United States Patent
Tai et al.

(10) Patent No.: US 7,339,575 B2
(45) Date of Patent: Mar. 4, 2008

(54) OPTICAL POINTING DEVICE WITH VARIABLE FOCUS

(75) Inventors: Li Chong Tai, Penang (MY); Theng Theng Quek, Penang (MY); Ban-Kuan Koay, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 585 days.

(21) Appl. No.: 10/853,625

(22) Filed: May 25, 2004

(65) Prior Publication Data

US 2005/0264531 A1   Dec. 1, 2005

(51) Int. Cl.
  G09G 5/08   (2006.01)
(52) U.S. Cl. ...................................... 345/166
(58) Field of Classification Search ............... 345/157, 345/163, 166
  See application file for complete search history.

(56) References Cited

U.S. PATENT DOCUMENTS

| 6,081,388 | A  | * | 6/2000  | Widl ........................... 359/666 |
| 6,211,861 | B1 | * | 4/2001  | Rosenberg et al. ......... 345/163 |
| 6,281,882 | B1 |   | 8/2001  | Gordon et al. |
| 6,369,954 | B1 |   | 4/2002  | Berge et al. |
| 6,433,780 | B1 |   | 8/2002  | Gordon et al. |
| 6,476,970 | B1 |   | 11/2002 | Smith |
| 6,618,038 | B1 | * | 9/2003  | Bohn .......................... 345/164 |
| 7,122,781 | B2 | * | 10/2006 | Rotzoll et al. .............. 250/221 |
| 7,161,582 | B2 | * | 1/2007  | Bathiche et al. ............ 345/156 |
| 2003/0028734 | A1 | * | 2/2003 | March et al. ................ 711/154 |
| 2004/0017129 | A1 |   | 1/2004 | Hooley et al. |

FOREIGN PATENT DOCUMENTS

WO   WO 03069380 A1   8/2003

OTHER PUBLICATIONS

"Background", <http://ise.stanford.edu/class/psych221/projects/99/klchan/background.html> Accessed May 17, 2004.
"Miniature AutoFocus Camera". <http://www.1limited.com/tech/mac/index> Accessed May 17, 2004.
"Product: PDN-1000 Tunable Lens Units". <http://www.varioptic.com/V2/products/autofocus/product_full_dn1000.htm> Accessed May 17, 2004.

* cited by examiner

Primary Examiner—Sumati Lefkowitz
Assistant Examiner—Rodney Amadiz

(57) ABSTRACT

A method and apparatus for focusing an image of a work surface on an optical sensor array in an optical pointing device. Light from a region of the work surface is captured by an imaging system incorporating an optical coupling system and the optical sensor array. The focus of the imaging system is adjusted in accordance with the distance between the optical pointing device and the work surface. The distance may be sensed, or inferred by adjusting the imaging system to maximize the focus of the image.

30 Claims, 4 Drawing Sheets

OPTICAL POINTING DEVICE WITH VARIABLE FOCUS

BACKGROUND

The use of a hand operated pointing device to indicate positions on a visual display is well known. A popular device is a computer mouse. In a typical mouse, motion of the mouse is sensed and translated into motion of a cursor or other indicator displayed on a visual display. A computer mouse may operate, for example, by measuring rotations of a ball as it moves across the surface of a mouse pad or rotated by the user. Alternatively, it may operate by measuring accelerations of the mouse using inertial sensors, or by estimating motion by detecting changes in successive images of the surface over which the mouse moves. A pointing device that uses the last approach is called an optical mouse or a 'seeing-eye' mouse.

In one approach, an optical mouse forms images of the micro-textured or micro-detailed work surface below the mouse using an array of optical sensors. The outputs from the array of optical sensors are digitized and stored as a frame in memory. Successive frames are compared to estimate the motion that has occurred between frames. The motion information is then communicated to the controller of the visual display.

An optical mouse has advantages over a mechanical mouse, since it has no moving parts to malfunction through wear or the build-up of debris. However, it is occasionally necessary to reposition a mouse on the work surface without changing the indicated position on the visual display. This poses problems for an optical mouse, since the repositioning motion will result in unwanted movement of the cursor on the visual display unless an additional sensor or a user-operated switch is incorporated to indicate when the mouse is lifted from the work surface.

A further problem arises if the work surface has a transparent covering, such as sheet of glass. The transparent covering alters the distance between the reflecting surface and the array of optical sensors, causing the image of the surface to be out of focus.

SUMMARY

The present invention relates generally to an optical pointing device having a variable focus imaging system. Objects and features of the invention will become apparent to those of ordinary skill in the art upon consideration of the following detailed description of the invention.

Light from a region of the work surface is captured by an imaging system incorporating an optical coupling system and the optical sensor array. Focus of the imaging system may be adjusted based on the distance between the optical pointing device and the work surface. The distance may be sensed, or inferred by adjusting the imaging system to maximize the focus of the image.

In one embodiment of the invention, an optical pointing device includes a variable focus lens coupled to an auto-focus control circuit. In a further embodiment of the invention, an optical pointing device includes a movable optical sensor array coupled to an auto-focus control circuit. In a still further embodiment of the invention, an optical pointing device includes a movable lens coupled to an auto-focus control circuit.

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

Figure 1:
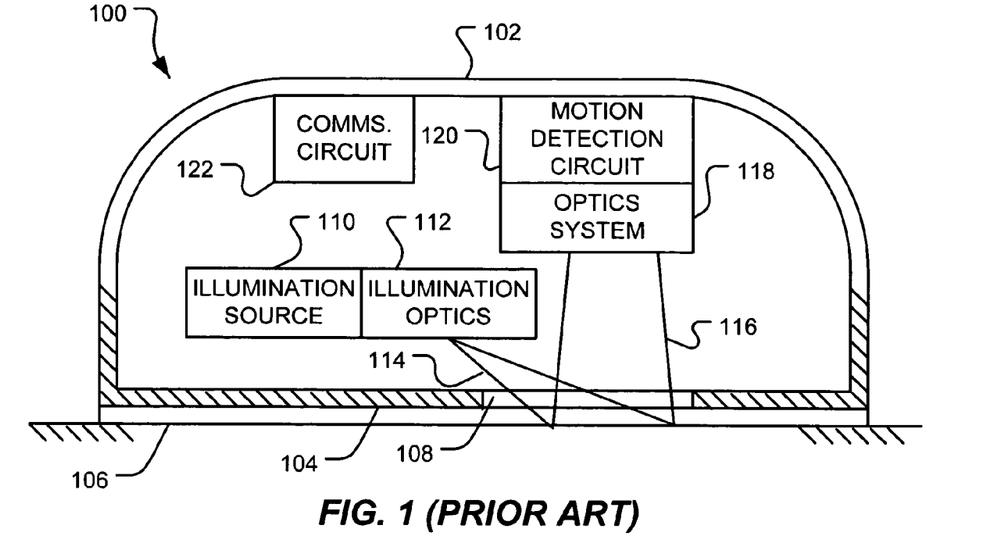
FIG. 1 is a diagrammatic representation of an optical mouse of the prior art.

An exemplary optical mouse known in the prior art is shown in FIG. 1. The mouse 100 includes a housing 102 having a bottom wall 104 that moves across an opaque or reflecting work surface 106. The bottom wall 104 contains an aperture 108 to allow light to pass. An illumination source 110 and associated illumination optics 112 are positioned within the housing. The illumination source 110 may be a light emitting diode (LED) or other source of non-coherent light. Light 114 from this illumination source 110 illuminates a region of the work surface 106. A portion 116 of the light 114 is reflected from the surface and enters the housing through the aperture 108. In the housing, the light passes through an optical coupling system 118 and is focused on an array of optical sensors that forms part of a motion detection circuit 120. The motion detection circuit 120 includes the array of optical sensors, a memory for storing frames of digitized optical sensor outputs and a means for estimating motion from successive frames of digitized optical sensor outputs. Signals representing the motion of the mouse are communicated via communication circuit 122 to a computer using a wired or wireless communication channel.

In prior optical mice, the optical coupling system 118 has fixed optical properties. In particular, the focal length of the optical system is fixed so that when the mouse is placed on an opaque surface, an image of the surface is focused on the array of optical sensors. However, when a transparent layer lies between the bottom surface of the optical mouse and an opaque surface, the length of the optical path from the opaque surface to the array of optical sensors is increased. As a result, the image of the opaque surface is focused in front array of optical detectors and is out of focus on the array.

Figure 2:
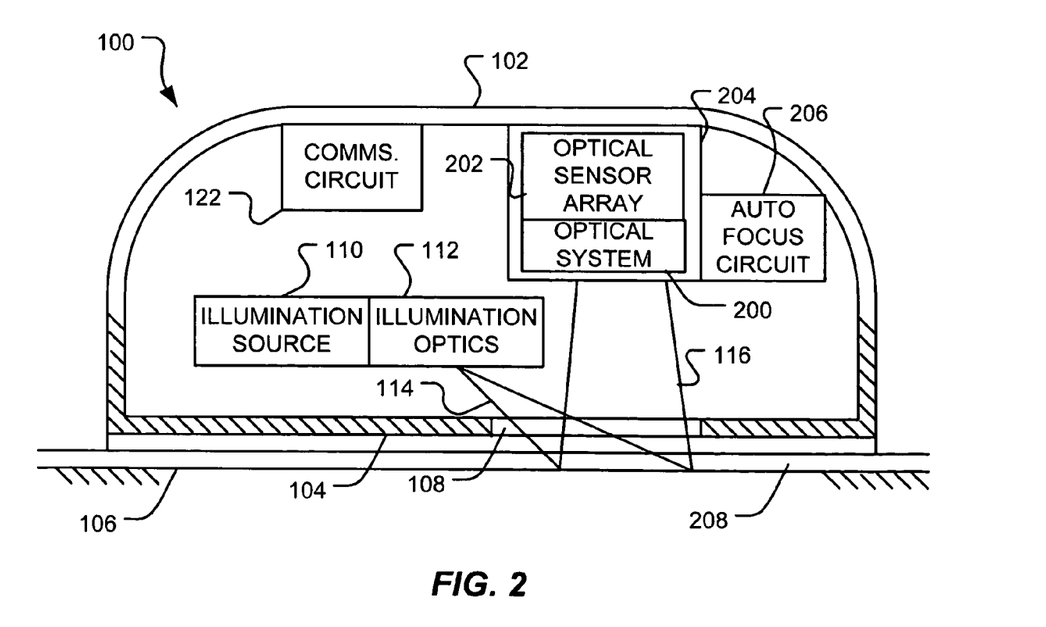
FIG. 2 is a diagrammatic representation of an optical pointing device in accordance with certain embodiments of the present invention.

FIG. 2 is a diagrammatic representation of an optical pointing device in accordance with embodiments of the present invention. An optical coupling system 200 projects light onto an optical sensor array 202. Together, the optical coupling system 200 and the optical sensor array 202 form an imaging system 204. In one example, the imaging system 204 has a variable focus. In the embodiment shown in FIG. 2, the illumination source 100, and imaging system 204 are mounted within a housing 102 having a wall 104. Light passes to and from the work surface 106 through an aperture 108.

Other embodiments will be apparent to those of ordinary skill in the art. For example, any of the imaging system, the illumination source and other components may be mounted on a support structure that is moved across the work surface. The components may be mounted on the outside of the support structure, in which case an aperture is not needed. In the sequel, the term support structure is taken to include housings and other structures. When the pointing device is a hand-operated device, such as a computer mouse, the support structure may be adapted to support the hand of the user.

In an alternative embodiment of the present invention, an auto-focus circuit 206 is provided. The auto-focus circuit 206 is coupled to the imaging system 204. The provision of a variable focus imaging system allows the optical pointing device to be used when a transparent layer 208 covers the opaque or reflecting work surface 106.

In alternative embodiments of the present invention, the optical coupling system 200 includes a variable focus lens and a variable position lens.

In a still further embodiment of the present invention, the optical sensor array is moveable to allow focusing of the light on the array. The motion of the optical sensor array may be controlled by the auto-focus circuit 206.

An example of a variable focus lens is a liquid lens that uses the electro-wetting properties of conducting liquids to alter the focal length of a liquid lens. Such lenses are known to those of ordinary skill in the art and are available commercially. An example is the tunable lens part number PDN-1000 manufactured by Varioptic of France. (See also U.S. Pat. No. 6,369,954 and international patent application number WO 03/069380).

A fluid lens typically comprises a drop of insulating liquid immersed in a chamber of conducting liquid. The two liquids are immiscible and have similar densities. The insulating liquid drop is positioned on a first surface of an insulating wall of the chamber and an electrode is placed on the other surface of the insulating wall. The curved surface between the two liquids forms a lens. A voltage applied between the conducting liquid and the electrode increases wetting of the insulting wall by the conducting fluid. This phenomenon is called electro-wetting. The increased wetting by the conducting liquid reduces the diameter of the insulating liquid drop, thereby increasing its radius of curvature and altering the focal length of the lens.

A further example of a variable focus lens is a membrane liquid lens that uses an electromechanical, piezoelectric or other actuator to apply a force to a volume of transparent liquid in a container. One wall of the container includes a flexible, transparent membrane that forms a lens. The opposite wall of the container is also transparent, allowing light to pass through the membrane and the container. A force applied to the liquid is exerted on the flexible membrane, causing it to deform. The change in the radius of curvature of the flexible membrane alters the power of the lens.

The focal length f of a lens having one planar surface is given by $$\frac{1}{f} = \frac{n - n_0}{R_1},$$

where $R_1$ is the radius of curvature of the interface between the two fluids and n and $n_0$ are the refractive indices of the two fluids.

In an electro-wetting liquid lens, the volume of insulating liquid is constant, hence when the diameter D of lens is decreased, the radius of curvature decreases and the focal length decreases. In a flexible-membrane liquid lens, the diameter of the lens is constant, but the radius of curvature is decreased as more force is applied to the liquid in the container.

In an electro-wetting lens, the voltage applied between the conducting liquid and the electrode is usually an alternating voltage. The amount of wetting is determined by the root mean square of the applied voltage, Vrms. By varying the applied voltage Vrms, the aperture and the focal length of the lens can be changed.

In accordance with other embodiments of the present invention, the optical pointing device includes a liquid lens having a variable focal length or both a liquid lens having a variable focal length and conventional lens having a fixed focal length.

In a further embodiment of the present invention, the focus of the optical pointing device is adjusted by an auto-focus circuit. Auto-focus systems are commonly used in cameras. In one approach, the distance from the lens to the object to be photographed is estimated by transmitting a pulse of ultrasonic acoustic energy or infrared energy from the camera and measuring the amount of time until the pulse reflected from the object is detected. The position of the camera lens is then adjusted accordingly so that the image is focused on the film or optical sensor array. In a further approach, the position of the camera lens is adjusted such that some measure of the 'sharpness' or focus of the image is maximized. The focus of the image may be adjusted until the intensity difference between adjacent pixels in the array of optical sensors is maximized, or until the short wavelength components of the image are maximized. These approaches may be used in various embodiments of the optical pointing device of the present invention.

In an alternative embodiment, the surface quality of the image formed on the optical sensor array is used as an indicator of the degree of focus. The surface quality is a measure of the number of features visible by the optical sensor array. The surface quality reduces to a low value when there is no surface close to the pointing device or when the optical system is out of focus.

In a simplified embodiment, the system is optimally focused when the focal length f satisfies the equation $$\frac{1}{f} = \frac{1}{s_1} + \frac{1}{s_2},$$

where $s_1$ is the distance from the lens to the object and $s_2$ is the distance from the lens to the optical sensor array. When a variable focal length lens is used, the focal length f may be determined from the applied voltage and the known properties of the lens. In addition, the distance $s_2$ from the lens to the optical sensor array is known. Hence, the distance $s_1$ from the lens to the object may be determined. This value of the distance $s_1$ may be used to determine when the pointing device has been lifted off of the work surface. The motion detection circuit can be disabled when the distance is above a predetermined threshold.

The relationship between the focal length and the level of the control signal is known from the properties of the lens and may be written as f=F(Vrms). Hence, the distance $s_1$ from the lens to the object may be calculated from the equation $$\frac{1}{s_1} = \frac{1}{F(Vrms)} - \frac{1}{s_2}.$$

Since the distance $s_2$ from the lens to the optical sensor array is fixed, the values of $s_1$ as a function of the voltage Vrms may be tabulated in a look-up table.

As the pointing device is being moved from the work surface or placed on the work surface, the auto-focus circuit alters the focal length of the lens. The motion detection circuit may be disabled until the image is refocused.

Figure 3:
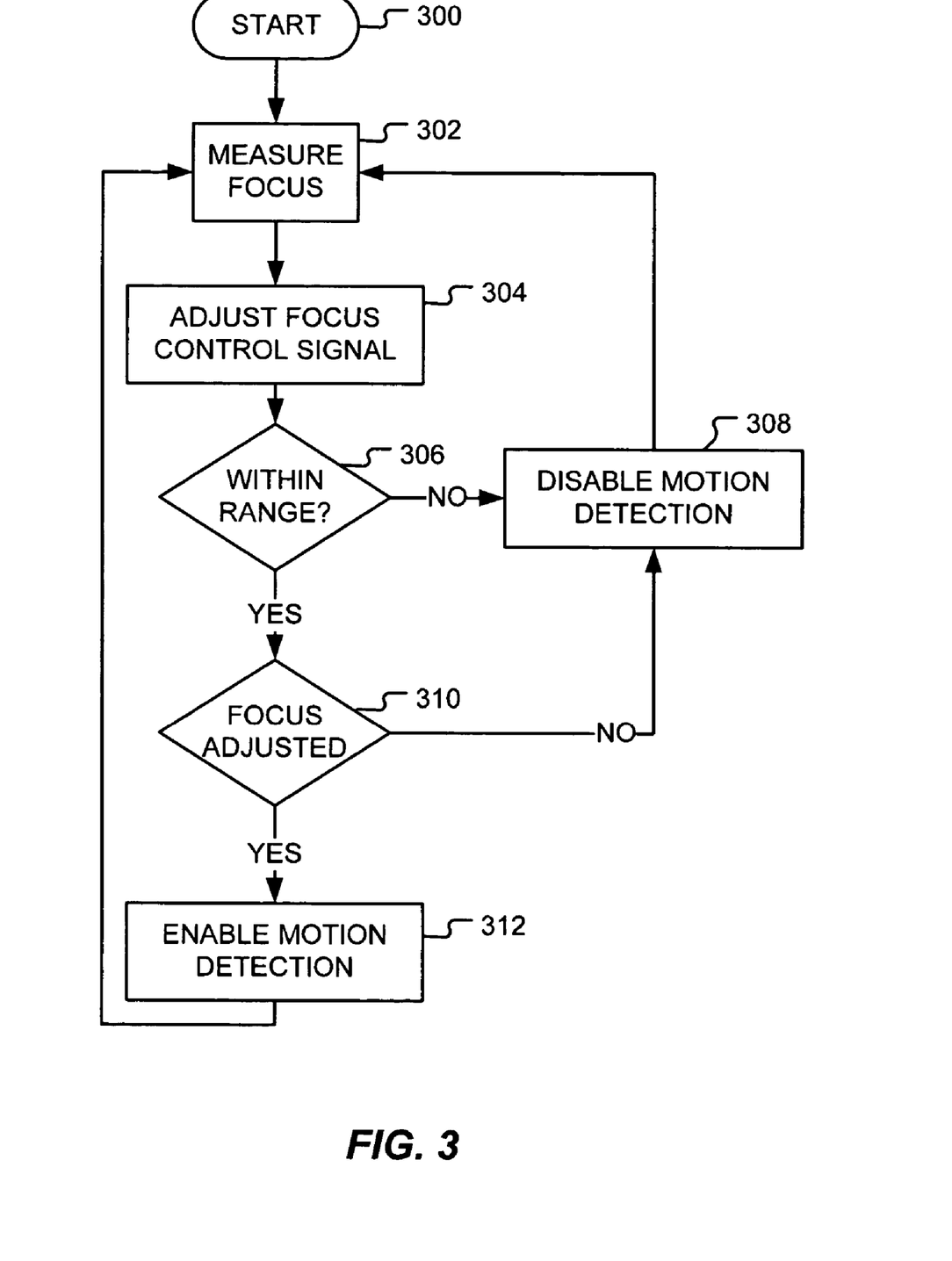
FIG. 3 is a flow chart depicting operation of an optical pointing device in accordance with certain embodiments of the present invention.

FIG. 3 is a flow chart depicting operation of the optical pointing device in accordance with certain aspects of the present invention. Referring to FIG. 3, following start block 300, the degree of focus of the system is measured at block 302. This may be a passive measurement, in which the degree of focus or sharpness of the illuminated region of the work surface is determined from the image, or it may be an active measurement in which the distance to the work surface is measured by generating a signal and comparing it the corresponding signal reflected from the work surface. Examples of such signals are laser light beams and infrared light beams.

At block 304 the focus control signal is adjusted dependent upon the measured degree of focus. For example, if the distance to the work surface is measured, the corresponding voltage to the lens may be determined from a look-up table. Alternatively, if the degree of focus of the image is measured, it may be compared with the previous measure of degree of focus. If the degree of focus has increased, the lens is adjusted in the same direction as previously, whereas if the degree of focus has decreased, the lens is adjusted in the opposite direction.

At decision block 306 a determination is made as to whether the lens control signal (or, equivalently, the distance to the work surface) is within a predetermined range. If not, as indicated by the negative branch from decision block 306, the motion detection circuit is disabled at block 308 and flow return to block 302. This prevents unwanted motion of a cursor on the visual display as the optical pointing device is being repositioned on the work surface. If the focus control signal (or, equivalently, the distance to the work surface) is within the predetermined range, as indicated by the positive branch from decision block 306, flow continues to decision block 310.

At decision block 310, a determination is made as to whether the focus adjustment has been completed so that the image of the illuminated work surface is focused on the optical sensor array. If not, as indicated by the negative branch from decision block 310, the motion detection circuit is disabled at block 308 and flow returns to block 302. This prevents unwanted motion of a cursor on the visual display as the optical pointing device is in the process of being removed from the work surface of placed upon it, or if the thickness of the transparent layer has changed. If the focus is fully adjusted, as indicated by the positive branch from decision block 310, the motion detection circuit is enabled at block 312 and flow returns to block 302. When the motion detection circuit is enabled, motion of the optical pointing device over the work surface is measured and communicated to the visual display using a wired or wireless communication channel.

In one embodiment of the present invention, the auto-focus circuit operates to maximize a measure of the degree of focus. When the optimal focus is achieved, a subsequent change will reduce the amount of focus, so the change will be reversed at the next step. This results in a sequence of changes in alternating directions. The detection of a sequence of alternating steps may be used as an indication that optimal focus has been achieved and that motion detection may begin.

The brightness or intensity of an image depends upon the aperture (diameter) D of the lens and the distance $s_1$ from the lens to the optical sensor array. An increased aperture allows more light to pass and so increases the brightness. An increased focal length increases the area of the image and so decreases the brightness. Hence the intensity I is proportional to $$\frac{D^2}{s_2^2}.$$

This property may be taken into account in the selection of an appropriate liquid lens and illumination source.

Figure 4:
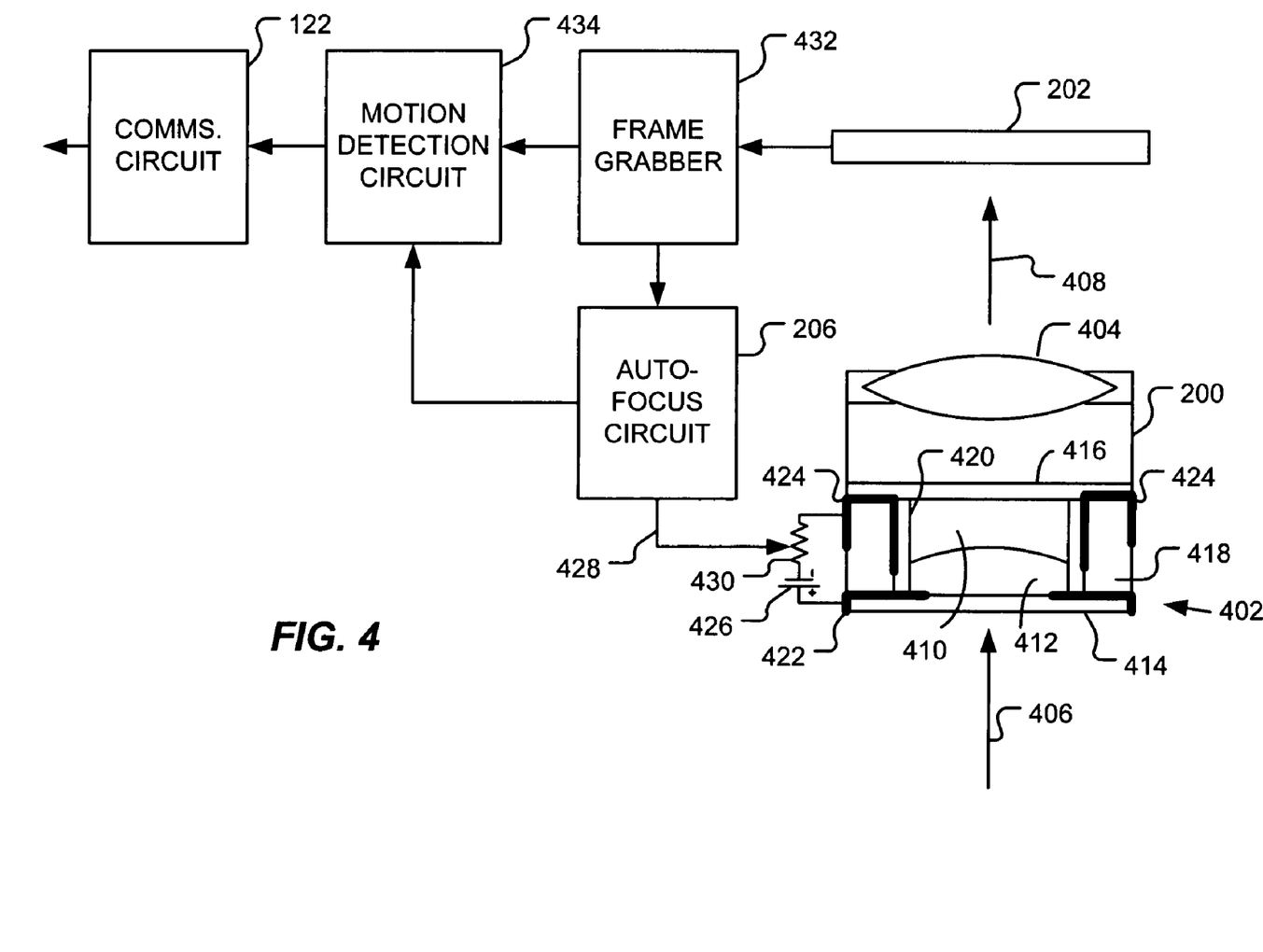
FIG. 4 is a diagrammatic representation of an optical coupling system and associated components in accordance with certain embodiments of the present invention.

FIG. 4 is a diagrammatic representation of an optical coupling system and associated components in accordance with certain embodiments of the present invention. Referring to FIG. 4, an optical sensor array is configured to receive light from an optical coupling system 200. In this embodiment the optical coupling system 200 comprises a variable focus lens 402 and, optionally, one or more fixed focus optical components shown symbolically as 404. Light 406, reflected from the work surface, enters the optical coupling system 200. Light 408 exits the optical coupling system 200 and is focused on the optical sensor array 202. The variable focus lens 402 may be an electro-wetting lens comprising a conducting liquid 410 and an insulating liquid 412. The conducting liquids 410 and insulating liquid 412 are contained within a glass cylinder having end plates 414 and 416 and cylindrical shell 418. The cylindrical shell 418 is lined with insulating material 420. Electrodes 422 and 424, together with voltage supply 426, provide an electrical potential that induces an electro-wetting effect. The amount of wetting of the liquid 410 is controlled by electrical control signal 428 that adjusts the voltage potential across the electrodes. This is shown as a variable series resistance 430 in the figure, but it will be apparent to those of ordinary skill in the art that a variety of other circuits may be used to adjust the potential. The amount of wetting by the conducting liquid 410 determines the focal length of the liquid lens 402.

While a variable focus liquid lens utilizing electro-wetting is depicted in the figure, it will be apparent to those of ordinary skill in the art that other variable focus lenses may be used, including a moveable lens. It will also be apparent that the auto-focus circuit may alternatively be coupled to an actuator configured to adjust the position of the optical sensor array 202 relative to the optical coupling system or the work surface.

Frame grabber 432 digitizes the signals from the optical sensor array 202 and stores them as image frames in a memory. In this embodiment, auto-focus circuit 206 receives successive image frames and adjusts the control signal 428 so as to maximize the degree of focus of the image. Motion detection circuit 434 also receives successive image frames from the frame grabber 432 and processes them to determine motion of the pointing device over the work surface. The motion detection circuit 434 is activated when the auto-focus circuit 206 indicates that the image has been sufficiently focused and that the pointing device is on the work surface. Finally, a communication circuit 122 encodes the detected motion and transmits it to control a visual display.

The auto-focus circuit, motion detection circuit and other processing elements may be performed on a microprocessor based computers, digital signal processors, microcontrollers, dedicated processors, custom circuits, ASICS and/or dedicated hard wired logic, for example.

Figure 5:
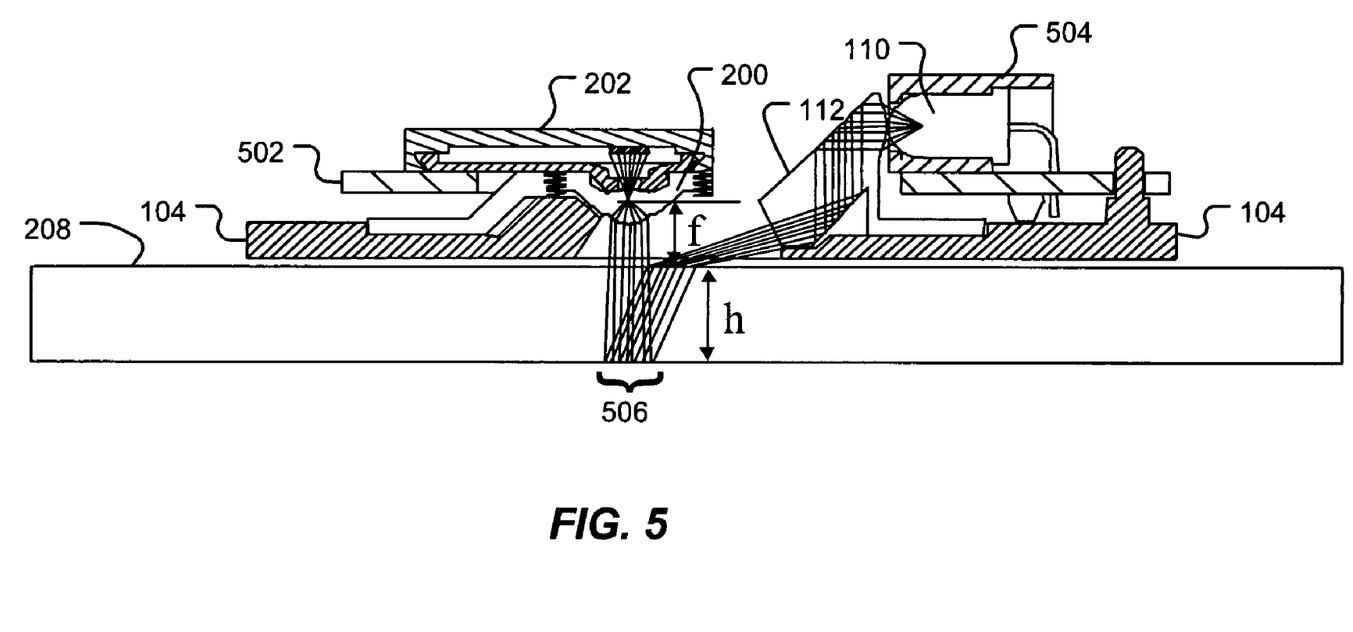
FIG. 5 is a cross-sectional view of an exemplary optical pointing device in accordance with certain embodiments of the present invention.

FIG. 5 is a cross-sectional view of an exemplary optical pointing device in accordance with certain aspects of the present invention. Referring to FIG. 5, only a portion 104 of the support structure is shown. Other elements, such as manual control buttons, are omitted for clarity. Printed circuit board 502 provides processing elements for the auto-focus circuit and motion detection circuit. An LED illumination source 110 is secured to the support structure 104 by clip 504. Light from the illumination source 110 is guided through illumination optics 112 and falls on the surface of the transparent layer 208. Optionally, the illumination optics 112 or the optical coupling system 200 is moveable to ensure that light from the illuminated region 506 of the work surface is aligned with the optical coupling system 200. The adjustment may be made to maximize the intensity of the image formed on the optical sensor array. The optical sensor array 202 is positioned to receive light from the optical coupling system 200.

In order to compensate for different thicknesses h of the transparent layer 208, the focus of the system is adjusted automatically by varying the focal length of a lens in the optical coupling system 200, by adjusting the position of a lens in the optical coupling system 200 or by adjusting the position of the optical sensor array 202.

In one embodiment, the position of a lens in the optical coupling system or the optical sensor array is adjusted. The position of the lens or the sensor array may be altered using a mechanical actuator, such as a piezoelectric actuator. An example is the HELIMORPH® piezoelectric actuator manufactured by 1 Limited of the U.K. The lens and the optical sensor array may be moved independently or together. Moving the optical sensor array alters the optical path length from the work surface to the optical sensor array. In this embodiment, the focal length f of the optical coupling system is fixed. Alternatively, the distance $s_1$ from the lens to the object and/or the distance $s_2$ from the lens to the optical sensor array are adjusted so that the equation $$\frac{1}{f} = \frac{1}{s_1} + \frac{1}{s_2}$$

is satisfied. Since $s_2$ and f are known, the distance $s_2$ can be determined once focus is achieved.

In a further embodiment, both the position and focal length of the lens in the optical coupling system are adjusted to give an increased range of focus.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An optical pointing device comprising:
   a support structure operable to move across a work surface;
   an illumination source, coupled to the support structure, operable to illuminate a region of the work surface;
   an imaging system coupled to the support structure comprising:
      an optical sensor array; and
      an optical coupling system operable to receive light from the illuminated region of
      the work surface and transmit the received light to the optical sensor anay;
   an auto-focus circuit operable to focus an image of the illuminated region of the work surface on the optical sensor array, the auto-focus circuit outputting a focus control signal; and
   a motion detection circuit coupled to the optical sensor array operable to detect motion of the optical pointing device, the motion detection circuit receiving the focus control signal output by the auto-focus circuit, the focus control signal causing the motion detection circuit to be disabled if the auto-focus circuit determines that the image of the illuminated region is not sufficiently in focus.

2. An optical pointing device in accordance with claim 1, wherein the optical coupling system comprises a variable focus lens and the auto-focus circuit is operable to adjust the focal length of the variable focus lens.

3. An optical pointing device in accordance with claim 1, wherein the auto-focus circuit is operable to maximize a measure of spatial variations in the image of the illuminated work surface.

4. An optical pointing device in accordance with claim 1, wherein the auto-focus circuit is operable to maximize the surface quality of the image of the illuminated work surface.

5. An optical pointing device in accordance with claim 1, wherein the auto-focus circuit is operable to sense a distance to illuminated work surface and to determine a desired focus of the imaging system therefrom.

6. An optical pointing device in accordance with claim 5, wherein the focus control signal causes the motion detection circuit to be disabled when the focus control signal is outside of a predetermined range.

7. An optical pointing device in accordance with claim 1, wherein the optical coupling system comprises a variable focus liquid lens in which electro-wetting is used to alter the focal length of the lens.

8. An optical pointing device in accordance with claim 1, wherein the optical coupling system comprises a variable focus liquid lens having a deformable membrane covering a volume of liquid, wherein a force is applied to the liquid by an actuator, thereby causing the membrane to deform and alter the focal length of the lens.

9. An optical pointing device in accordance with claim 1, wherein the optical coupling system comprises a variable focus lens and one or more fixed optical elements.

10. An optical pointing device in accordance with claim 1, wherein the position of the illumination source is adjustable to align the position of the illuminated region of the work surface with the optical coupling system.

11. An optical pointing device in accordance with claim 1, wherein the optical coupling system comprises a lens moveable by action of an actuator, and wherein the auto-focus circuit is operable to control the actuator to adjust the position of the lens and thereby adjust the focus of the imaging system.

12. An optical pointing device in accordance with claim 1, wherein the actuator is a piezoelectric actuator.

13. An optical pointing device in accordance with claim 1, wherein the optical sensor array is moveable by action of an actuator, and wherein the auto-focus circuit is operable to control the actuator to adjust the position of the optical sensor array and thereby adjust the focus of the imaging system.

14. A method for focusing an image of a work surface on an optical sensor array in an imaging system of an optical pointing device, the method comprising: coupling light from a region of the work surface through an optical coupling system in the imaging system to the optical sensor array; and determining the motion of the optical pointing device with a motion detection circuit; adjusting the focus of the imaging system in accordance with the distance between the optical pointing device and work surface such that an image of a work surface is focused on the optical sensor array; determining whether the image of the work surface is sufficiently focused on the optical sensor array; and producing a control signal in the imaging system that causes the motion detection circuit to be disabled if a determination is made that the image of the work surface is not sufficiently focused on the optical sensor array.

15. A method in accordance with claim 14, wherein adjusting the focus of the imaging system comprises: measuring the distance from a reference point in the optical pointing device to the work surface; and determining, from the measured distance, the control signal to be applied to the imaging system.

16. A method in accordance with claim 15, wherein determining the control signal to be applied to the imaging system comprises retrieving one or more parameters of the control signal from a predetermined look-up table indexed by the measured distance and determining, based on the one or more retrieved parameters, whether the image of the work surface is sufficiently focused on the optical sensor array.

17. A method in accordance with claim 14, wherein adjusting the focus of the imaging system comprises:
    determining the focus of a previous image from spatial variations of the image;
    adjusting the focus of the imaging system in a first direction; and
    repeatedly performing:
        determining the focus of a current image from spatial variations of the image;
        adjusting the focus of the imaging system in the first direction if the focus has increased; and
        adjusting the focus of the imaging system in a direction opposite to the first direction if the focus has decreased.

18. A method in accordance with claim 17, wherein the step of determining the motion comprises:
    in the motion detecting circuitry, determining motion of the optical pointing device from successive images of a work surface on an optical sensor array only if successive adjustments to the focus of the imaging system indicate that sufficient focusing has been achieved, the control signal causing the motion detection circuitry to be enable if successive adjustments to the focus of the imaging system indicate that sufficient focusing has been achieved.

19. A method in accordance with claim 17, wherein adjusting the focus of the imaging system comprises supplying the control signal to the imaging system, and further comprising determining the distance between the optical pointing device and work surface from control signal.

20. A method in accordance with claim 19, wherein the step of determining the motion comprises determining the motion of the optical pointing device from successive images of the work surface on the optical sensor array if the distance between the optical pointing device and work surface is within a predetermined range.

21. A method in accordance with claim 14, wherein adjusting the focus of the imaging system comprises energizing an actuator to adjust the position of the optical sensor anay relative to the work surface.

22. A method in accordance with claim 14, further comprising:
    illuminating a region of the work surface by passing light from an illumination source though illumination optics; and
    adjusting at least one of the illumination source and the illumination optics to align the illuminated region of the work space with the imaging system.

23. A method in accordance with claim 22, further comprising:
    determining the intensity of the image formed on the optical sensor array; and
    adjusting the position of at least one of the illumination source and the illumination optics to maximize the intensity of the image.

24. An apparatus for sensing motion of a structure across an illuminated work surface, the apparatus comprising:
    an imaging means coupled to the structure, the imaging means comprising:
    an optical sensing means for producing an image of the illuminated work surface; and
    an optical coupler for receiving light from the illuminated work surface and transmitting the received light to the optical sensing means;
    a focus means for adjusting the imaging means such that an image of the illuminated work surface is focused on the optical sensing means, the focus means outputting a focus control signal; and
    a motion detection means for determining motion of the structure from successive images of the illuminated work surface, the motion detection means receiving the focus control signal output by the focus means, the focus control signal causing the motion detection means to be disabled if the focus means determines that the image of the illuminated region is not sufficiently in focus.

25. An apparatus in accordance with claim 24, further comprising an illumination means for illuminating the work surface, the illumination means being coupled to the structure.

26. An apparatus in accordance with claim 24, wherein the focus means comprises a control means for adjusting the imaging means automatically, such that an image of the illuminated work surface is focused on the optical sensing means.

27. An apparatus in accordance with claim 26, wherein the focus means further comprises a means for sensing the distance from the structure to the illuminated work surface and wherein the control means is responsive to the sensed distance.

28. An apparatus in accordance with claim 26, wherein the focus means further comprises a means for determining a measure of the focus of the image on the optical sensing means and wherein the control means is responsive to the measure of the focus.

29. An apparatus in accordance with claim 24, wherein the optical coupler comprises a variable focus lens and the focus means is operable to adjust the focal length of the variable focus lens.

30. An apparatus in accordance with claim 24, wherein the focus means is operable to adjust the position of the optical sensing means.

* * * * *

UNITED STATES PATENT AND TRADEMARK OFFICE
CERTIFICATE OF CORRECTION

PATENT NO.       : 7,339,575 B2                                              Page 1 of 1
APPLICATION NO.  : 10/853625
DATED            : March 4, 2008
INVENTOR(S)      : Li Chong Tai et al.

It is certified that error appears in the above-identified patent and that said Letters Patent is hereby corrected as shown below:

Title page, Column 2, (Other Publications), Line 5, delete "Units"." and insert -- Unit", --;

Column 8, Line 13, Claim 1, delete "anay" and insert -- array --;

Column 9, Line 14, Claim 14, delete "surface" and insert -- surface, --;

Column 9, Line 67, Claim 20, delete "anay" and insert -- array --;

Column 10, Line 6, Claim 21, delete "anay" and insert -- array --.

Signed and Sealed this

Eighth Day of June, 2010

David J. Kappos
*Director of the United States Patent and Trademark Office*